United States Patent
Morino et al.

(10) Patent No.: US 8,696,184 B2
(45) Date of Patent: Apr. 15, 2014

(54) SURFACE LIGHT SOURCE DEVICE

(71) Applicants: Takeshi Morino, Yokohama (JP);
Masataka Shiratsuchi, Kawasaki (JP);
Yoshinori Honguh, Yokohama (JP)

(72) Inventors: Takeshi Morino, Yokohama (JP);
Masataka Shiratsuchi, Kawasaki (JP);
Yoshinori Honguh, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/673,001

(22) Filed: Nov. 9, 2012

(65) Prior Publication Data
US 2013/0114293 A1 May 9, 2013

(30) Foreign Application Priority Data
Nov. 9, 2011 (JP) .................................. 2011-245331

(51) Int. Cl.
*F21V 7/04* (2006.01)

(52) U.S. Cl.
USPC ............ 362/608; 362/615; 362/621; 362/628

(58) Field of Classification Search
USPC .................................. 362/608, 615, 621, 628
See application file for complete search history.

(56) References Cited

U.S. PATENT DOCUMENTS

| | | | |
|---|---|---|---|
| 6,247,826 B1 * | 6/2001 | Funamoto et al. | 362/603 |
| 2004/0114343 A1 * | 6/2004 | Ho | 362/31 |
| 2007/0236909 A1 * | 10/2007 | Tamura | 362/26 |
| 2010/0172151 A1 * | 7/2010 | Parker | 362/608 |
| 2012/0113682 A1 | 5/2012 | Morino et al. | |

FOREIGN PATENT DOCUMENTS

| | | |
|---|---|---|
| JP | 2004-288570 | 10/2004 |
| JP | 2011-138698 | 7/2011 |

* cited by examiner

*Primary Examiner* — Mary Ellen Bowman
(74) *Attorney, Agent, or Firm* — Oblon, Spivak, McClelland, Maier & Neustadt, L.L.P.

(57) ABSTRACT

According to one embodiment, a surface light source device includes a light guide plate, and first and second light-emitting units. The light guide plate includes a flat portion and a curved portion. The curved portion guides, to the flat portion, light introduced from the end surface and transmits light introduced from the inner circumferential surface. The flat portion includes a light diffusing portion to diffuse the light guided by the curved portion, and a light-emitting surface to output the light diffused by the light diffusing portion. The first light-emitting unit emits light toward the end surface. The second light-emitting unit emits light toward the inner circumferential surface.

7 Claims, 8 Drawing Sheets

SURFACE LIGHT SOURCE DEVICE

CROSS-REFERENCE TO RELATED APPLICATIONS

This application is based upon and claims the benefit of priority from Japanese Patent Application No. 2011-245331, filed Nov. 9, 2011, the entire contents of which are incorporated herein by reference.

FIELD

Embodiments described herein relate generally to a surface light source device used as, for example, a backlight of a liquid crystal display device.

BACKGROUND

As a backlight used for a liquid crystal display device, an edge-light type backlight is known. The edge-light type backlight introduces, from the side edge surface of a rectangular flat light guide plate, light emitted by a light source, and outputs it from the principal surface of the light guide plate. The edge-light type backlight is advantageous in terms of reducing the thickness of a housing, compared to a direct type backlight which includes a light source opposed to the back surface of a liquid crystal panel and directly illuminates the liquid crystal panel.

However, in an edge-light type backlight, a light source is arranged opposite to the side edge surface of a light guide plate, that is, a light source is accommodated in the frame part (i.e., bezel) of a housing, thus disadvantageously requiring a housing having a large frame part.

DETAILED DESCRIPTION

In general, according to one embodiment, a surface light source device comprises a light guide plate, a first light-emitting unit, and a second light-emitting unit. The light guide plate comprises a flat portion having a rectangular cross-sectional shape, and a curved portion having a curved cross-sectional shape. The curved portion comprises an end surface and an inner circumferential surface to introduce light. The curved portion is configured to guide, to the flat portion, light introduced from the end surface and transmit light introduced from the inner circumferential surface. The flat portion comprises a light diffusing portion to diffuse the light guided by the curved portion, and a light-emitting surface to output the light diffused by the light diffusing portion. The first light-emitting unit is configured to emit light toward the end surface. The second light-emitting unit is configured to emit light toward the inner circumferential surface.

Embodiments provide a surface light source device including a housing having a small frame part.

Hereinafter, surface light source devices according to the embodiments will be described with reference to the accompanying drawings as needed. Each of these surface light source devices is used as a backlight used for a liquid crystal display device, a lighting equipment, or the like. The case wherein the surface light source device is used as a backlight of a liquid crystal display device will be taken as an example in each of the embodiments. In this case, the surface light source device is disposed so that its light-emitting surface is opposed to the back surface of a liquid crystal panel.

First Embodiment

Figure 1:
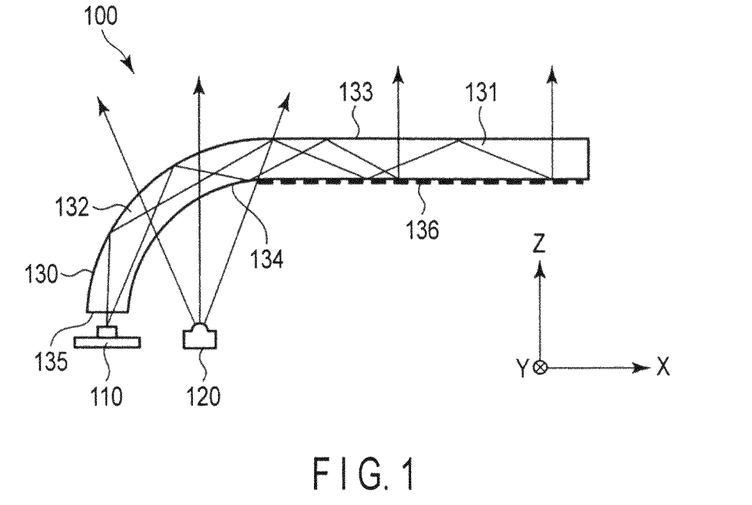
FIG. 1 is a side view schematically showing a surface light source device according to the first embodiment.

FIG. 1 is a side view schematically showing a surface light source device 100 according to a first embodiment. The surface light source device 100 includes a first light-emitting unit 110, a second light-emitting unit 120, and a light guide plate 130, as shown in FIG. 1. The first light-emitting unit 110, second light-emitting unit 120, and light guide plate 130 are fixed to a housing or a back cover (not shown).

The first light-emitting unit 110 is arranged opposite to an end surface 135 of the light guide plate 130, and emits light toward the end surface 135. The first light-emitting unit 110 of the present embodiment is a light-emitting element array formed by aligning, along the end surface 135, a plurality of light-emitting elements which emit light beams (for example, white light beams). A light-emitting diode (LED), for example, can be used as the light-emitting element.

The light guide plate 130 is made of transparent glass or resin. An acrylic or polycarbonate resin, for example, can be used as the transparent resin. The light guide plate 130 is formed in a shape obtained by curving the end part of a rectangular flat plate. Specifically, the light guide plate 130 includes a flat portion 131 and a curved portion 132.

Note that an X-Y-Z orthogonal coordinate system is defined, as shown in FIG. 1, for the sake of convenience. The thickness direction of the flat portion 131 of the light guide plate 130 is defined as the Z-direction, the direction in which the light-emitting elements in the first light-emitting unit 110 are arrayed is defined as the Y-direction, and a direction perpendicular to the Y- and Z-directions is defined as the X-direction. For example, when the surface light source device 100 is used as a backlight of a liquid crystal display device such as a liquid crystal display television, the X-direction corresponds to the horizontal direction (or right-to-left direction), and the Y-direction corresponds to the vertical direction (or top-to-bottom direction).

The cross-section of the flat portion 131 taken along any virtual plane perpendicular to the Y-direction has a rectangular shape. Also, the cross-section of the curved portion 132 taken along any virtual plane perpendicular to the Y-direction has an at least partially curved shape or a shape having a curved part. More specifically, the curved portion 132 has a cross-sectional shape approximated by an arc subtending an angle of about 90°, and has nearly the same thickness as the flat portion 131. The light guide plate 130 includes two opposed principal surfaces 133 and 134, and four end surfaces arranged between principal surfaces 133 and 134. Of these end surfaces, an end surface 135 positioned on the side of the curved portion 132 serves as a light incident surface which introduces light emitted by the first light-emitting unit 110. In the present embodiment, principal surface 133 opposed to a liquid crystal panel (not shown) when the surface light source device 100 is opposed to the liquid crystal panel will be referred to as a front surface, and the other principal surface 134 will be referred to as a back surface. The front surface corresponds to a light-emitting surface from which illumination light is output.

The second light-emitting unit 120 is arranged opposite to the back surface 134 of the light guide plate 130 on the side of the curved portion 132, and emits light toward the back surface (also called the inner circumferential surface) 134 of the curved portion 132. The back surface 134 of the curved portion 132 is also referred to as the inner circumferential surface. The second light-emitting unit 120 of the present embodiment is a light-emitting element array formed by aligning a plurality of light-emitting elements (for example, LEDs) in the Y-direction, like the first light-emitting unit 110. The second light-emitting unit 120 may be an LED module which uses a LED and lens in combination.

Light emitted by the first light-emitting unit 110 strikes the light guide plate 130 from the end surface 135 of the curved portion 132, and propagates through the light guide plate 130 while repeating total internal reflection. The light which propagates through the light guide plate 130 is diffused by a light diffusing pattern (also called a light diffusing portion) 136 formed in the flat portion 131, and is output outside the light guide plate 130 from the front surface 133 of the flat portion 131. In this way, light from the first light-emitting unit 110 is guided to a region corresponding to the flat portion 131 of the light guide plate 130.

In the present embodiment, the light diffusing pattern 136 is formed on the back surface 134 of the flat portion 131. Examples of a method of forming the light diffusing pattern 136 include a method of printing a white silk screen on the back surface 134, a method of forming minute concavities and convexities on the back surface 134 of the flat portion 131 in molding the light guide plate 130, and a method of forming minute concavities and convexities on the back surface 134 of the flat portion 131 by laser processing after molding the light guide plate 130. Note that the light diffusing pattern 136 is not limited to an example in which it is formed on the back surface 134 of the flat portion 131, and may be fine particles which have a light diffusion property and are supplied into the light guide plate 130.

On the other hand, light emitted by the second light-emitting unit 120 strikes the light guide plate 130 from the back surface 134 of the curved portion 132, and is output from the front surface 135 of the curved portion 132 without remaining in the light guide plate 130. That is, light from the second light-emitting unit 120 is transmitted through the curved portion 132. In this way, light from the second light-emitting unit 120 is guided to a region corresponding to the curved portion 132 of the light guide plate 130.

Illumination light of the surface light source device 100 is formed by the light output from the flat portion 131 and the light transmitted through the curved portion 132. Using, as illumination light of the surface light source device 100, light which is emitted by the second light-emitting unit 120 and transmitted through the curved portion 132 allows both a region corresponding to the flat part 131 and a region corresponding to the curved portion 132 to serve as the light-emitting surface. Also, since the first light-emitting unit 110 and second light-emitting unit 120 are disposed on the side of the back surface 134 of the light guide plate 130, a housing need not include a frame part for accommodating the first light-emitting unit 110 and second light-emitting unit 120.

In the present embodiment, because the curved portion 132 is smaller than the flat portion 131, a region illuminated by the first light-emitting unit 110 is wider than a region illuminated by the second light-emitting unit 120. Hence, to obtain spatial uniformity of the luminance distribution the surface light source device 100, it is necessary to set the total intensity of light emitted by the second light-emitting unit 120 smaller than that of light emitted by the first light-emitting unit 110. This requirement can be satisfied by adjusting at least one of light intensity of each light-emitting element and the interval at which the light-emitting elements are arrayed. In an example, light-emitting elements are arrayed more sparsely in the second light-emitting unit 120 than in the first light-emitting unit 110. That is, the interval at which the light-emitting elements in the second light-emitting unit 120 are arrayed is set larger than that at which the light-emitting elements in the first light-emitting unit 110 are arrayed. In another example, light intensity of each light-emitting element in the second light-emitting unit 120 is controlled to be smaller than that of each light-emitting element in the first light-emitting unit 110.

Figure 2:
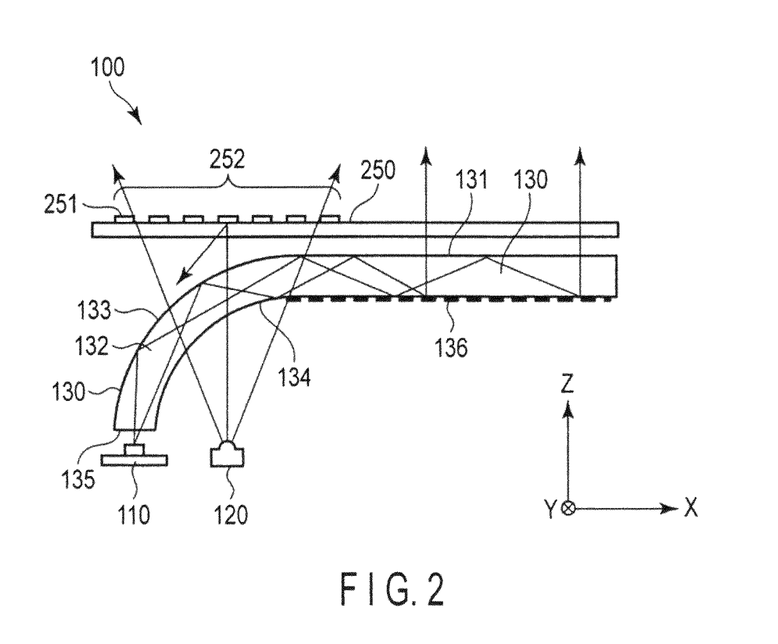
FIG. 2 is a side view illustrating an example in which the surface light source device shown in FIG. 1 includes a luminance control sheet.

However, when spatial uniformity of the luminance distribution is to be obtained by adjusting at least one of the light intensity of each light-emitting element and the interval at which the light-emitting elements are arrayed, the usable type of LED may be limited, and it may be necessary to adjust, with very high accuracy, the position of each light-emitting element and the light intensity of this light-emitting element. Thus, the surface light source device 100 may further include a luminance control sheet 250 which controls the luminance of light output from the light-emitting surface and that of light transmitted through the curved portion, as shown in FIG. 2. The luminance control sheet 250 includes a light diffusion region 252 in which light diffusion dots 251 which diffuse light are formed. The light diffusion region 252 is typically formed in a portion through which light which is emitted by the second light-emitting unit 120 and transmitted through the curved portion 132 passes.

Examples of a method of forming the light diffusion dots 251 include a method which uses silk screen printing, a method of forming three-dimensional dots on the luminance control sheet 250 using a high-power laser, and a method of attaching silver foil dots to the luminance control sheet 250. Alternatively, the light diffusion dots 251 may be formed by combining these methods.

Figure 3:
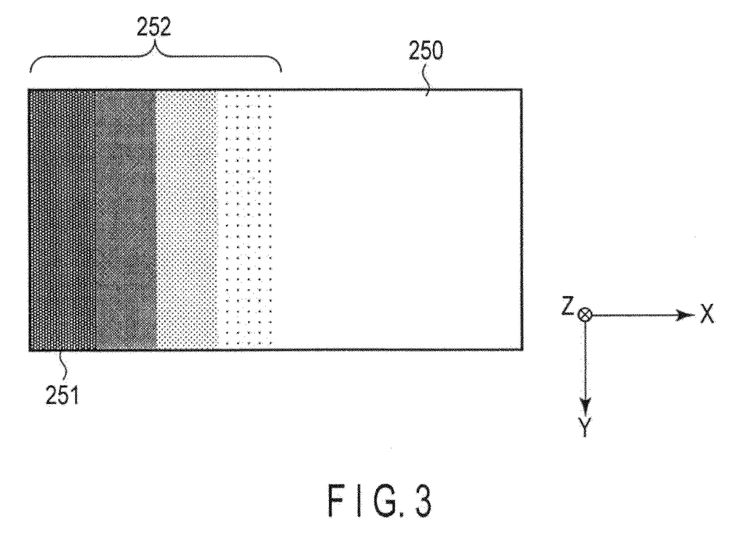
FIG. 3 is a top view schematically showing the luminance control sheet shown in FIG. 2.

In the light diffusion region 252, the dot size or the pitch between dots is changed, that is, the density of light diffusion dots 251 is changed to change the spatial light transmittance, as shown in FIG. 3. Although the light transmittance varies across individual partial regions within the light diffusion region 252 in FIG. 3, the light diffusion dots 251 are formed so that the light transmittance smoothly changes within the plane of the luminance control sheet 250. Providing a luminance control sheet 250 having a plurality of light transmittances different within its plane makes it easy to obtain spatial uniformity of the luminance distribution of the surface light source device 100.

As described above, in the surface light source device 100 according to the first embodiment, light sources (i.e., first light-emitting unit 110 and second light-emitting unit 120) are disposed on the side of the back surface 134 of the light guide plate 130, thereby making it possible to make smaller or narrow the frame part of the housing, or to completely omit the frame part from the housing. It is therefore possible to narrow a frame part (i.e., bezel) of a housing in a liquid crystal display device which uses the surface light source device 100 as a backlight as well. Forming a frame narrow relative to the screen size makes it possible to improve the design performance of a liquid crystal display device so that, for example, the user feels the screen size relatively large.

Note that the second light-emitting unit is not limited to an example in which it includes light-emitting elements (that is, a light source). A second light-emitting unit according to another aspect will be described with reference to FIGS. 4 and 5.

Figure 4:
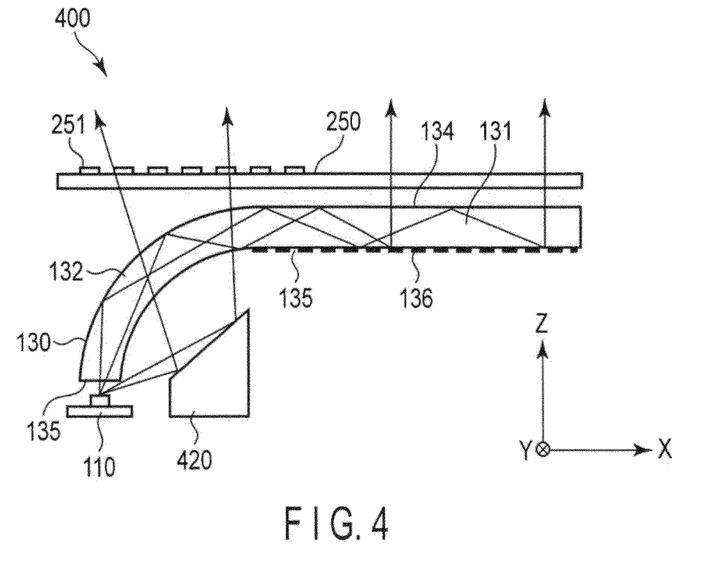
FIG. 4 is a side view schematically showing a surface light source device according to the first modification to the first embodiment.

FIG. 4 is a side view schematically showing a surface light source device 400 according to the first variation of the first embodiment. The same reference numbers as in FIG. 2 denote the same elements in FIG. 4, and a description thereof will not be given. The surface light source device 400 includes a member 420 corresponding to the second light-emitting unit, in place of the second light-emitting unit 120 shown in FIG. 1. The member 420 reflects light which is emitted by the first light-emitting unit 110 and leaked without striking the light guide plate 130 to guide it onto the back surface (i.e., inner circumferential surface) 134 of the curved portion 132. In an example, the member 420 has a surface which is oblique with respect to light leaked from the first light-emitting unit 110, and is coated with white or silver paint having a high reflectance. In another example, a high-reflectance mirror is used as the member 420. The surface light source device 400 according to the first variation of the first embodiment utilizes light leaked from the first light-emitting unit 110, thereby reducing the power consumption.

Figure 5:
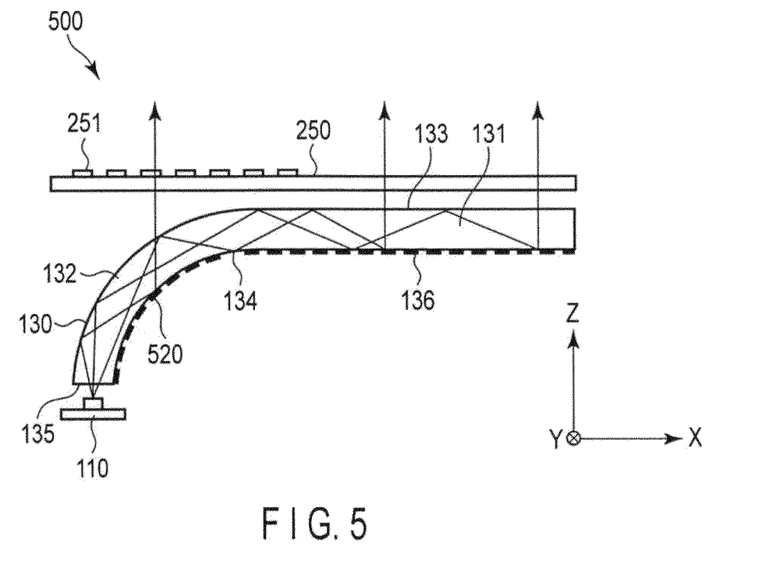
FIG. 5 is a side view schematically showing a surface light source device according to the second modification to the first embodiment.

FIG. 5 is a side view schematically showing a surface light source device 500 according to the second variation of the first embodiment. The same reference numbers as in FIG. 2 denote the same elements in FIG. 5, and a description thereof will not be given. The surface light source device 100 shown in FIG. 1 includes the light diffusing pattern 136 in the flat portion 131 of the light guide plate 130. In contrast to this, the surface light source device 500 shown in FIG. 5 includes the light diffusing pattern 136 formed on the entire back surface 134 of the light guide plate 130. A second light-emitting unit 520 of the surface light source device 500 corresponds to the light diffusing pattern 136 formed in the curved portion 132. The second light-emitting unit 520 diffuses light which propagates through the light guide plate 130 to output it from the front surface (i.e., outer circumferential surface) 133 of the curved portion 132.

Examples of a method of forming a light diffusing pattern as a second light-emitting unit include a method of printing a white silk screen on the entire back surface 134, a method of forming minute concavities and convexities on the entire back surface 134 in molding the light guide plate 130, and a method of forming minute concavities and convexities on the entire back surface 134 by laser processing after molding the light guide plate 130.

The surface light source device 500 according to the second variation of the first embodiment includes a light diffusing pattern formed on the back surface 134 of the curved portion 132 as a second light-emitting unit, thereby omitting the use of a member for the second light-emitting unit, that is, saving resources.

Figure 6:
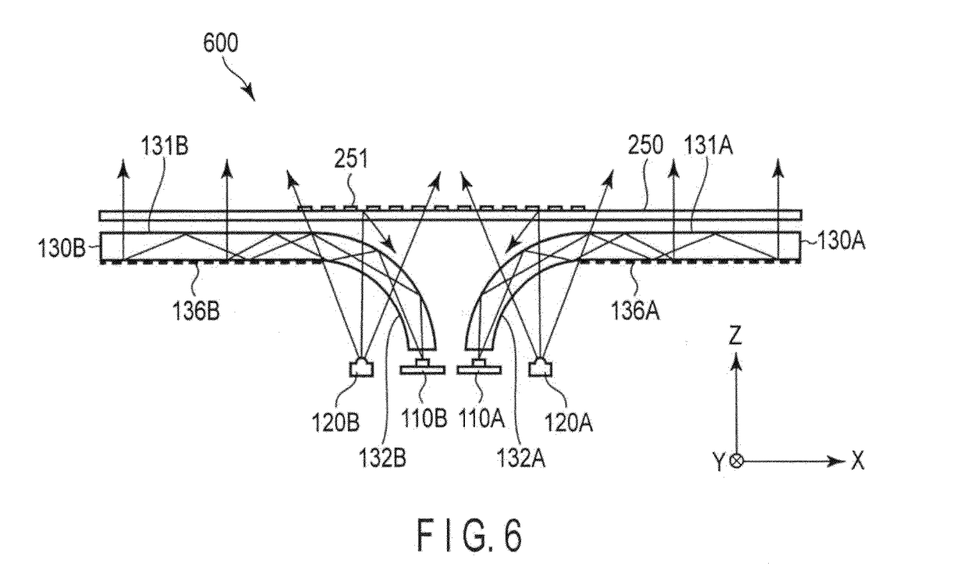
FIG. 6 is a side view schematically showing a surface light source device formed by combining two surface light source devices as shown in FIG. 1.

Moreover, upon defining a surface light source device having the above-mentioned configuration (for example, surface light source devices 100) as one unit, a plurality of units can be combined into one surface light source device. FIG. 6 is a side view schematically showing a surface light source device 600 according to the third variation of the first embodiment. The surface light source device 600 is obtained using a pair of bilateral surface light source devices 100 as shown in FIG. 2. The same reference numbers as in FIG. 2 denote the same elements in FIG. 6, and a description thereof will not be given. However, for the sake of distinction between bilateral elements in FIG. 6, suffixes A and B are added to reference numbers denoting these elements.

Figure 7:
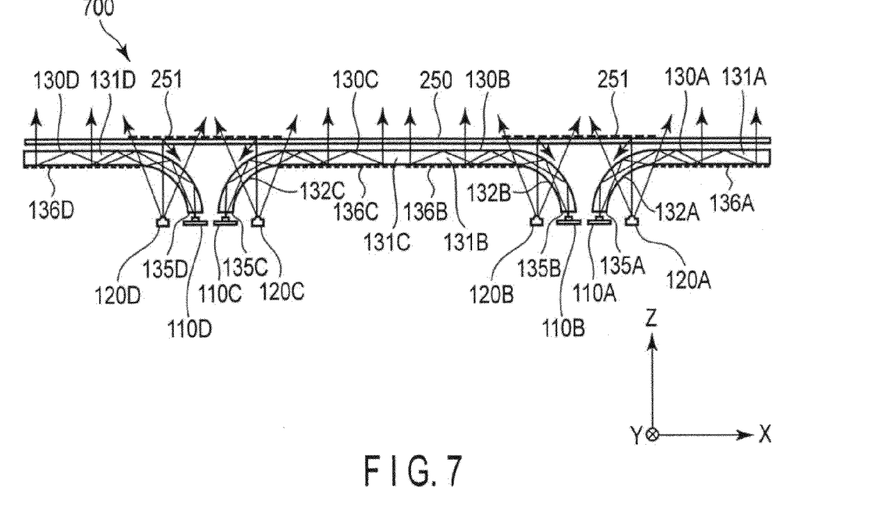
FIG. 7 is a side view schematically showing a surface light source device formed by combining two surface light source devices as shown in FIG. 6.

FIG. 7 shows a surface light source device 700 obtained further using a pair of bilateral surface light source devices 600 as shown in FIG. 6. However, for the sake of distinction between bilateral elements in FIG. 7, suffixes A, B, C, and D are added to reference numbers denoting these elements. In the surface light source device 700, light guide plates 130B and 130C are integrally formed, so a flat portion 131B of light guide plate 130B is continuous with a flat portion 131C of light guide plate 130C.

In this manner, combining a plurality of units into one surface light source device makes it possible to apply to a large-screen liquid crystal display device.

Second Embodiment

Figure 8:
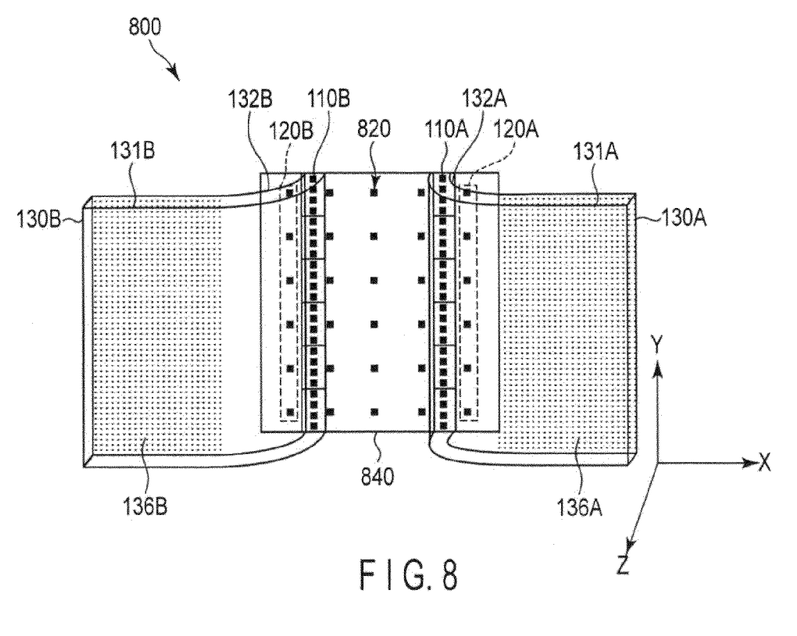
FIG. 8 is a perspective view schematically showing a surface light source device according to the second embodiment.

FIG. 8 is a perspective view schematically showing a surface light source device 800 according to a second embodiment. The surface light source device 800 shown in FIG. 8 is obtained by using a pair of bilateral surface light source devices 100 shown in FIG. 1, and additionally providing a third light-emitting unit (also called a direct light source) 820 which directly emits light toward an object. The same reference numbers as in FIG. 1 denote the same elements in FIG. 8, and a description thereof will not be given. However, for the sake of distinction between bilateral elements in FIG. 8, suffixes A and B are added to reference numbers denoting these elements.

Figure 9:
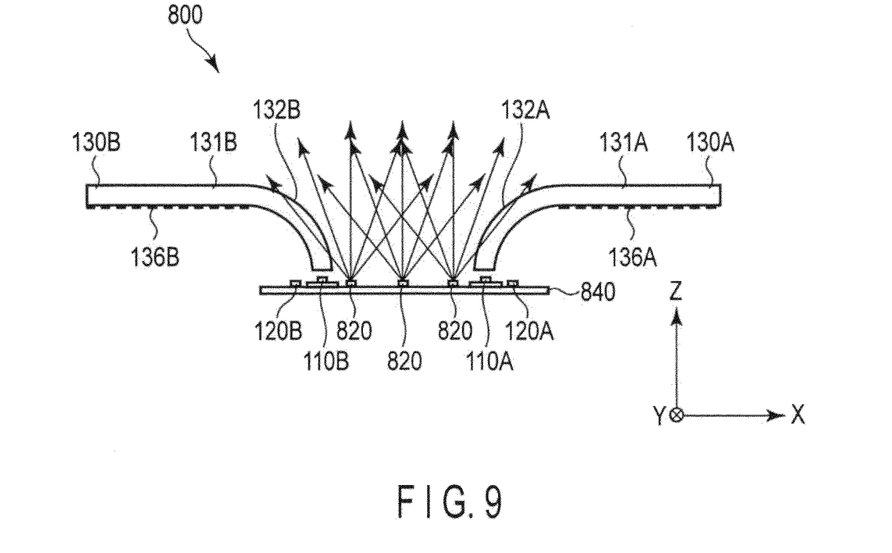
FIG. 9 is a side view schematically showing the optical path of light emitted by a third light-emitting unit shown in FIG. 8.

The third light-emitting unit 820 is mounted on a back cover 840, together with first light-emitting units 110A and 110B and second light-emitting units 120A and 120B, as shown in FIG. 8. The third light-emitting unit 820 is disposed between first light-emitting units 110A and 110B. The third light-emitting unit 820 includes at least one light-emitting element array, each of which includes a plurality of light-emitting elements (for example, LEDs) aligned in the Y-direction. FIG. 8 illustrates an example in which the third light-emitting unit 820 includes three light-emitting element arrays. Light emitted by the third light-emitting unit 820 serves as illumination light of the surface light source device 800 without striking light guide plates 130A and 130B, as shown in FIG. 9. When the surface light source device 800 is used as a backlight of a liquid crystal display device, the third light-emitting unit 820 serves as a light source which directly illuminates a liquid crystal panel or an optical sheet that forms the liquid crystal panel, such as a diffusion sheet and a prism sheet.

Figure 10:
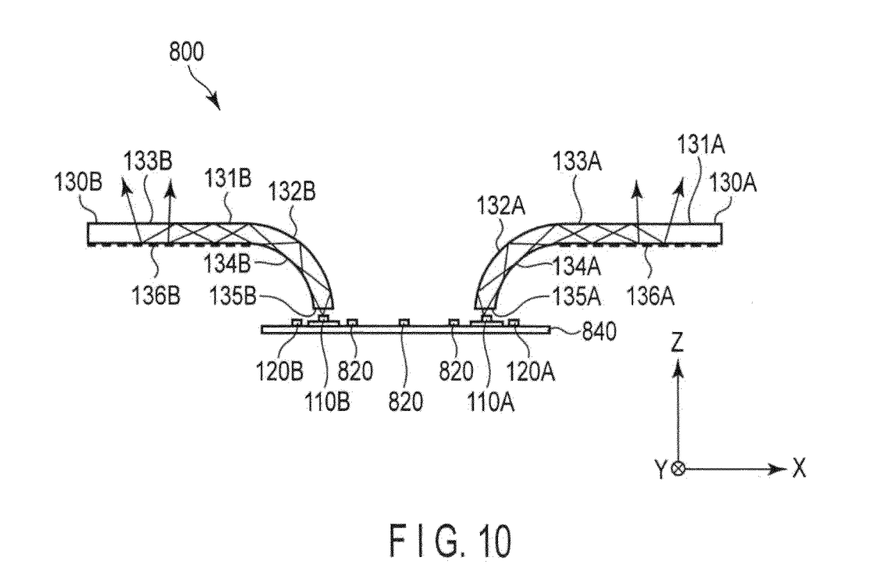
FIG. 10 is a side view schematically showing the optical paths of light beams emitted by first light-emitting units shown in FIG. 8.

On the other hand, a light beam emitted by first light-emitting unit 110A strikes a light guide plate 130A positioned on the side of a curved portion 132A from an end surface 135A of light guide plate 130A, and propagates through light guide plate 130A while repeating total internal reflection, as shown in FIG. 10. The light beam which propagates through light guide plate 130A is diffused by a light diffusing pattern 136A, and output from a front surface 133A of a flat portion 131A in the Z-direction. Similarly, a light beam emitted by first light-emitting unit 110B strikes a light guide plate 130B positioned on the side of a curved portion 132B from an end surface 135B of light guide plate 130B, and propagates through light guide plate 130B while repeating total internal reflection. The light beam which propagates through light guide plate 130B is diffused by a light diffusing pattern 136B, and output from a front surface 133B of a flat portion 131B in the Z-direction. The light beams output from flat portions 131A and 131B partially form illumination light of the surface light source device 800, and are guided to a liquid crystal panel or an optical sheet that forms the liquid crystal panel, such as a diffusion sheet and a prism sheet.

Figure 11:
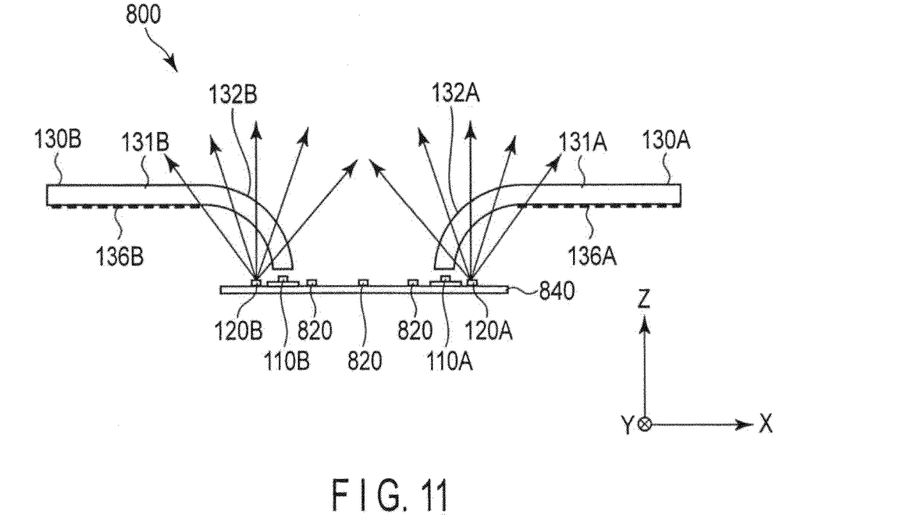
FIG. 11 is a side view schematically showing the optical paths of light beams emitted by second light-emitting units shown in FIG. 8.

A light beam emitted by second light-emitting unit 120A is transmitted through curved portion 132A of light guide plate 130A, as shown in FIG. 11. Similarly, a light beam emitted by second light-emitting unit 120B is transmitted through curved portion 132B of light guide plate 130B. When, for example, neither a second light-emitting unit 120A nor 120B is provided, no light beam is output from the vicinity of either curved portion 132A or 132B, so a very small amount of light illuminates regions corresponding to curved portions 132A and 132B. In this case, a discontinuous luminance distribution is generated, resulting in, for example, luminance nonuniformity with a peak shifted to the dark side. Such luminance nonuniformity leads to degradation in image quality of the liquid crystal display device. The surface light source device 800 of the present embodiment includes second light-emitting units 120A and 120B which emit light beams toward curved portions 132A and 132B, respectively, to output light beams from the vicinities of curved portions 132A and 132B as well, thereby obtaining a uniform luminance distribution.

Figure 12:
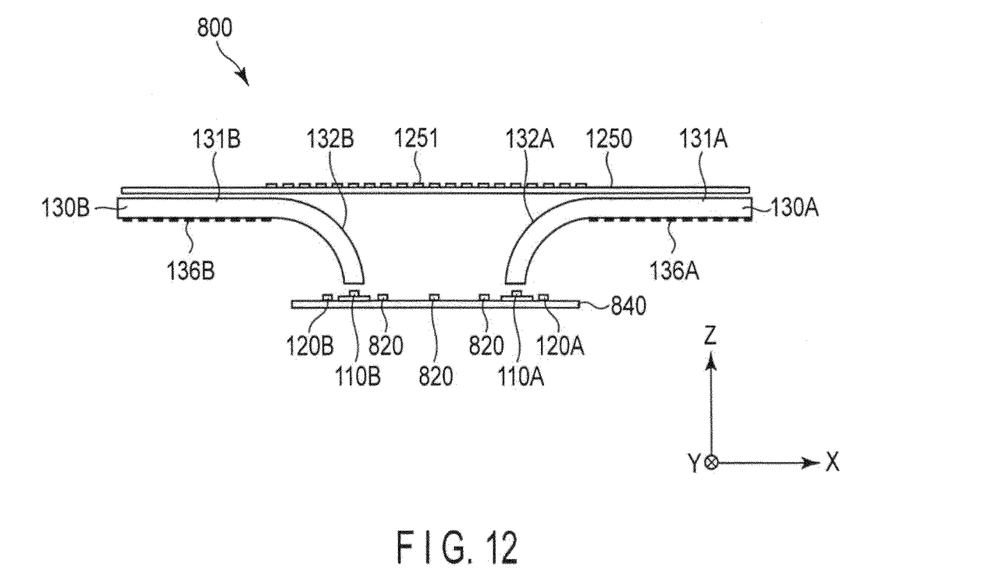
FIG. 12 is a side view illustrating an example in which the surface light source device shown in FIG. 8 includes a luminance control sheet.

Moreover, the surface light source device 800 may further include a luminance control sheet (luminance control unit) 1250 which controls the luminance of the light output from the light-emitting surface, that of the light transmitted through the curved portion, and that of the light emitted by the third light-emitting unit, as shown in FIG. 12. The luminance control sheet 1250 includes light diffusion dots 1251 formed thereon, and has a light transmittance which varies within its plane. The luminance control sheet 1250 has the same configuration as the luminance control sheet 250 shown in FIG. 2, and a detailed description thereof will not be given. The surface light source device 800 includes the luminance control sheet 1250 which has a light transmittance which varies within its plane, thereby obtaining a luminance distribution with higher uniformity.

The light-emitting elements in the third light-emitting unit 820 can individually be subjected to dimming control. Dimming control for each of a plurality of areas (that is, local dimming control) can be done by independently controlling the light-emitting elements in the third light-emitting unit 820 in accordance with a video signal displayed on the liquid crystal display device. The local dimming control means a technique of controlling the luminance of a backlight for each of a plurality of areas, obtained by virtually dividing the backlight, in accordance with a video signal input to a liquid crystal panel. The local dimming control can achieve both high contrast and low power consumption in the liquid crystal display device.

In an actual video content, its central portion is more likely to be brightest. Hence, local dimming control is known to produce a great effect when the amount of light at the central portion of the screen can be controlled independently. In the surface light source device 800 of the present embodiment, a third light-emitting unit including light-emitting elements which can be controlled independently is disposed at the central portion, so a great local dimming effect can be obtained.

Figure 13:
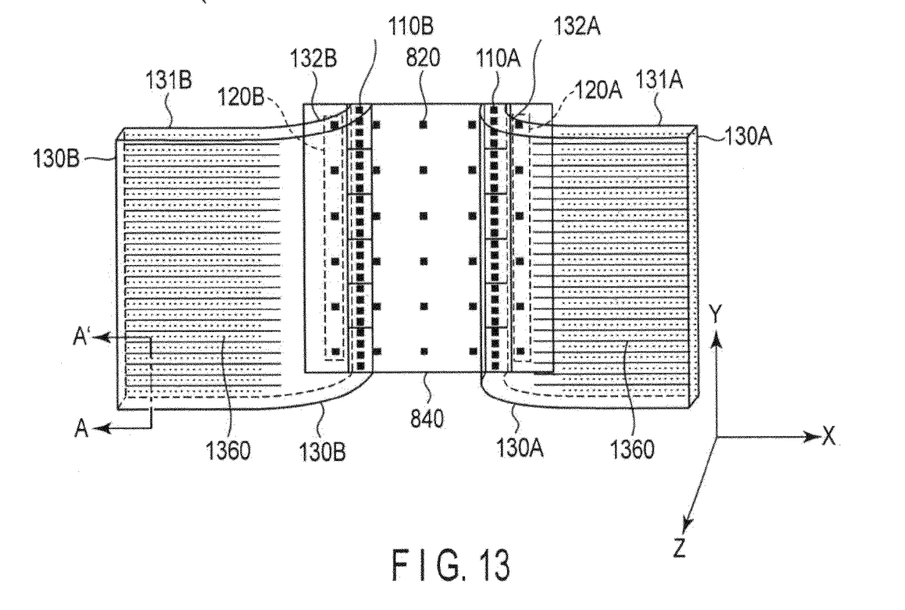
FIG. 13 is a perspective view illustrating an example in which light guide plates shown in FIG. 8 include light propagation control parts.

To obtain a greater local dimming effect, the surface light source device 800 may further include light propagation control parts 1360 having retroreflective properties. The light propagation control parts 1360 are provided on the front surface 133A of light guide plate 130A and the front surface 133B of light guide plate 130B, as shown in FIG. 13. The light propagation control parts 1360 can prevent light beams from diffusing in the Y-direction inside light guide plates 130A and 130B.

Figure 14A:
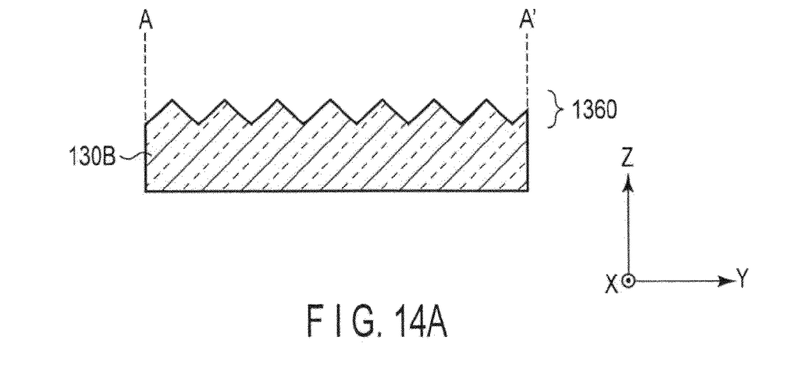
FIG. 14A is a sectional view illustrating an example of the light propagation control part shown in FIG. 13.

Specifically, the light propagation control part 1360 can be implemented by a linear prism structure formed by juxtaposing a plurality of linear prisms. FIG. 14A shows a cross-section of light guide plate 130B taken along a line A-A' in FIG. 13. Each linear prism is formed to extend in the X-direction. FIG. 14A illustrates an example in which each linear prism has a triangular cross-sectional shape. The light propagation control part 1360 provided on light guide plate 130A has the same cross-sectional shape.

A component, in the cross-section direction, of light which propagates through light guide plate 130B undergoes retroreflection by the linear prism structure. The light which passes through light guide plate 130B propagates while undergoing retroreflection, and therefore widely diffuses in the direction in which each linear prism extends (that is, the X-direction), but hardly diffuses in the direction in which the light-emitting elements in first light-emitting unit 110B are arrayed (that is, the Y-direction).

Figure 14B:
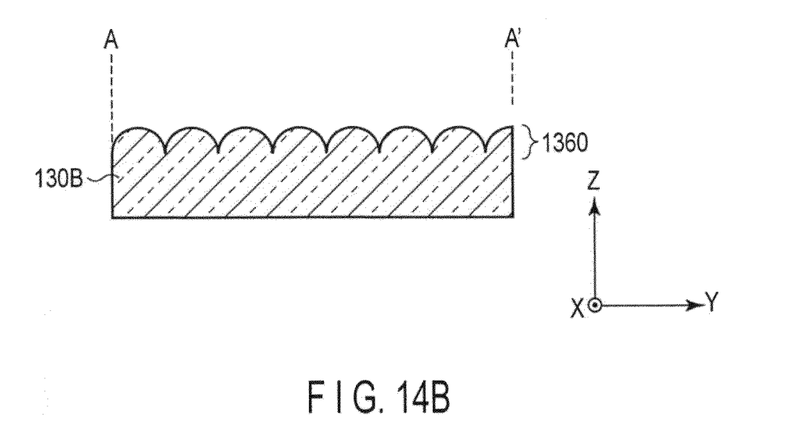
FIG. 14B is a sectional view illustrating another example of the light propagation control part shown in FIG. 13.
Figure 14C:
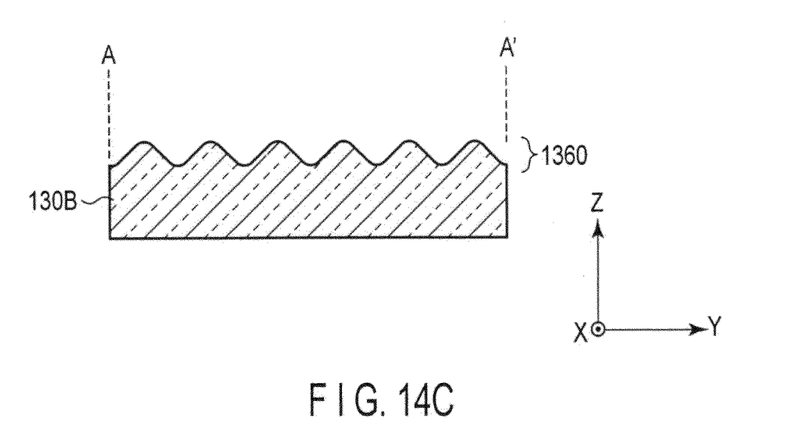
FIG. 14C is a sectional view illustrating still another example of the light propagation control part shown in FIG. 13.

In an example shown in FIG. 14A, the light propagation control part 1360 has a structure formed by arraying linear prisms having a triangular cross-sectional shape with the same size. The cross-sectional shape of each linear prism is not limited to a triangle, and may be, for example, a trapezoid or a semicircle. The light propagation control part 1360 may have a lenticular lens structure with a nearly semicircular cross-sectional shape, as shown in FIG. 14B. Alternatively, in terms of easy manufacture, each linear prism may have a truncated triangular cross-sectional shape, as shown in FIG. 14C.

By independently controlling the light-emitting elements in first light-emitting units 110A and 110B while light beams which propagate through light guide plates 130A and 130B are prevented from diffusing in the Y-direction by the light propagation control parts 1360 in this way, the luminances of the light beams from light guide plates 130A and 130B can be controlled for each of regions corresponding to the respective linear prisms. That is, local dimming control can be done not only at the central portion of the surface light source device 800 but also on the right and left peripheral portions.

The surface light source device 800 can perform dimming control for each of regions corresponding to the respective light-emitting elements in the third light-emitting unit 820 at the central portion, and for each of regions corresponding to the respective individual light propagation control parts 1360 on the peripheral portions. This makes it possible to perform scan control to two-dimensionally, sequentially light the regions in the surface light source device 800. The scan control means a technique of sequentially turning off backlights in the horizontal area for predetermined times at predetermined timings in synchronism with a video signal. Scan control can effectively suppress the generation of an after image at the time of playing back a moving image.

Note that a third light-emitting unit 820 which directly illuminates an object may be placed in the surface light source device 100 shown in FIG. 1. When a third light-emitting unit 820 is added to the surface light source device 100, it is arranged so that the first light-emitting unit 110 is disposed between the second light-emitting unit 120 and the third light-emitting unit 820.

As described above, the surface light source device 800 according to the second embodiment independently controls the light-emitting elements in first light-emitting units 110A and 110B, second light-emitting units 120A and 120B, and third light-emitting unit 820, thereby allowing local dimming control and scan control. Also, light sources (i.e., first light-emitting units 110A and 110B, second light-emitting units 120A and 120B, and third light-emitting unit 820) are disposed on the sides of the back surfaces of light guide plates 130A and 130B, thereby making it possible to make smaller or narrow a frame part, or to completely omit the frame part from the housing. Moreover, the thicknesses of housing portions provided with no light sources (portions provided with flat portions 131A and 131B) can be reduced. Hence, in a liquid crystal display device which uses the surface light source device 800 as a backlight, it is possible to narrow the frame part (i.e., bezel) of the housing, and dramatically reduce the thickness of the portion surrounding the frame part of the housing. That is, it is possible to improve the design performance of the liquid crystal display device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A surface light source device comprising:
a light guide plate comprising a flat portion having a rectangular cross-sectional shape, and a curved portion having a curved cross-sectional shape, the curved portion comprising an end surface and an inner circumferential surface to introduce light, the curved portion being configured to guide, to the flat portion, light introduced from the end surface and transmit light introduced from the inner circumferential surface, the flat portion comprising a light diffusing portion to diffuse the light guided by the curved portion, and a light-emitting surface to output the light diffused by the light diffusing portion;
a first light-emitting unit configured to emit light toward the end surface; and
a second light-emitting unit configured to emit light toward the inner circumferential surface.

2. The device according to claim 1, further comprising a luminance control sheet to control a luminance of the light output from the light-emitting surface and a luminance of the light transmitted through the curved portion, the luminance control sheet having a plurality of different light transmittances.

3. The device according to claim 1, further comprising a third light-emitting unit configured to directly illuminate an object with light.

4. The device according to claim 3, further comprising a luminance control sheet configured to control a luminance of the light output from the light-emitting surface, a luminance of the light transmitted through the curved portion, and a luminance of the light emitted by the third light-emitting unit, the luminance control sheet having a plurality of different light transmittances.

5. The device according to claim 1, wherein the first light-emitting unit comprises a light-emitting element array formed by aligning a plurality of light-emitting elements along the end surface.

6. The device according to claim 1, wherein the second light-emitting unit comprises a member to guide, to the inner circumferential surface, light which is emitted by the first light-emitting unit and leaked without striking the light guide plate.

7. The device according to claim 1, wherein the first light-emitting unit comprises a plurality of light-emitting elements arrayed at a first interval, and the second light-emitting unit comprises a plurality of light-emitting elements arrayed at a second interval larger than the first interval.

\* \* \* \* \*